(12) United States Patent
Poleg et al.

(10) Patent No.: US 11,531,755 B2
(45) Date of Patent: Dec. 20, 2022

(54) DETECTING RANSOMWARE AMONG FILES USING INFORMATION THAT IS NOT INCLUDED IN CONTENT OF THE FILES

(71) Applicant: Microsoft Technology Licensing, LLC, Redmond, WA (US)

(72) Inventors: Danielle Rachel Poleg, Tel Aviv (IL); Adi Rose Lefkowitz, Tel Aviv (IL); Amos Avraham Rimon, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/105,385

(22) Filed: Nov. 25, 2020

(65) Prior Publication Data

US 2022/0164445 A1 May 26, 2022

(51) Int. Cl.
*G06F 21/55* (2013.01)
*G06F 21/56* (2013.01)
*G06F 16/11* (2019.01)

(52) U.S. Cl.
CPC .......... *G06F 21/565* (2013.01); *G06F 16/122* (2019.01); *G06F 21/554* (2013.01); *G06F 21/564* (2013.01)

(58) Field of Classification Search
CPC .... G06F 21/565; G06F 16/122; G06F 21/554; G06F 21/564; G06F 21/56; G06F 21/55
See application file for complete search history.

(56) References Cited

U.S. PATENT DOCUMENTS

| | | | |
|---|---|---|---|
| 9,888,032 B2* | 2/2018 | Dekel | G06F 21/60 |
| 10,229,269 B1* | 3/2019 | Patton | G06F 21/554 |
| 10,339,301 B2* | 7/2019 | Pintiysky | G06F 21/53 |
| 10,685,111 B2* | 6/2020 | Brown | G06F 21/565 |
| 2017/0206353 A1* | 7/2017 | Jai | G06F 21/565 |
| 2017/0364681 A1* | 12/2017 | Roguine | G06F 21/554 |
| 2018/0048658 A1* | 2/2018 | Hittel | G06F 16/907 |
| 2018/0107824 A1* | 4/2018 | Gibbons, Jr. | G06F 21/565 |
| 2019/0121978 A1* | 4/2019 | Kraemer | G06F 21/565 |
| 2021/0182397 A1* | 6/2021 | Karnik | H04W 12/122 |
| 2021/0400057 A1* | 12/2021 | Devane | H04L 43/16 |

* cited by examiner

*Primary Examiner* — Jayesh M Jhaveri
(74) *Attorney, Agent, or Firm* — Wade IP Law PLLC

(57) ABSTRACT

Techniques are described herein that are capable of detecting ransomware among files using information that is not included in content of the files. The files are determined based on file-related operation(s) being performed on each of the files during a session of a cloud-based application. A subset of the files is determined such that each file in the subset has multiple file extensions during the session. A value, which is based on a number of the files in the subset, is compared to a threshold. A determination is made whether the files include the ransomware based on whether the value is greater than or equal to the threshold. An alert, which indicates that the files include the ransomware, is selectively triggered based on detection of whether the files include the ransomware.

24 Claims, 6 Drawing Sheets

DETECTING RANSOMWARE AMONG FILES USING INFORMATION THAT IS NOT INCLUDED IN CONTENT OF THE FILES

BACKGROUND

Ransomware is malware that is configured to perpetually block access to a victim's computing device and/or data unless a ransom is paid. For instance, the ransomware may encrypt the victim's data and require payment of the ransom in order for a decryption key, which is configured to decrypt the encrypted data, to be provided to the victim. Gaining access to the encrypted data without the decryption key typically is an intractable problem. Ransomware may be spread by a malicious shared file or a compromised network. For example, the victim may be tricked into opening or downloading a Trojan that is disguised as a legitimate file when the victim receives the Trojan as an email attachment. In another example, the ransomware may enter a compromised network and travel automatically between computers in the network without user interaction.

A variety of techniques has been proposed for detecting ransomware. However, each such technique has its limitations. For instance, most conventional techniques analyze content of files to determine whether the files are encrypted. Encryption of at least a subset of the files may indicate that the files include ransomware. However, analyzing the content of the files to check whether the files are encrypted typically consumes substantial time and computing resources, such as memory, processor cycles, and network bandwidth.

SUMMARY

Various approaches are described herein for, among other things, detecting ransomware among files using information that is not included in content of the files. For instance, the information may indicate that file-related operations have been performed on the files during a period of time and that one or more of the files has had multiple file extensions during the period of time. A file-related operation is an operation that is performed on a file. Examples of a file-related operation include but are not limited to upload, download, edit, rename, delete, and sync to cloud. A file may have one or more filenames. A filename of a file includes a body and one or more extensions. The body precedes the extensions. For example, if the filename is "file_name.ext," "file_name" is the body, and ".ext" is the extension. A filename of a file (or any portion of the filename) does not constitute content of the file.

Multiple file extensions of a file may be concatenated to provide a multiple-concatenated file extension. For example, a file that has a filename of "file_name.txt.encrypt" has a body of "file_name" and a multiple-concatenated file extension of ".txt.encrypt." An extension that is relatively closer to the body of the filename is referred to as an inner extension, and an extension that is relatively farther from the body of the filename is referred to as an outer extension. Accordingly, in this example, ".txt" is referred to as the inner extension, and ".encrypt" is referred to as the outer extension. A multiple-concatenated file extension may include any suitable number (e.g., 2, 3, 4, or 5) of file extensions that are concatenated.

Multiple file extensions of a file may occur (e.g., be used) in respective events. For instance, a file may have a first extension of ".txt" during a first event and a second extension of ".encrypt" during a second event. An event is an action or occurrence that is recognized by software (e.g., a cloud-based application). For example, the software may handle the event and/or generate a message indicating that the event has occurred. Events often originate asynchronously from an external environment, which is external to the software. Examples of an event include but are not limited to a file-related operation (as described above), login, and logout. The file extension that occurs in each event may be a multiple-concatenated file extension or a simple file extension. A simple file extension is a file extension that does not include multiple concatenated file extensions. Examples of a simple file extension include but are not limited to ".txt", ".encrypt", ".pdf", ".docx", and ".html".

In an example approach of detecting ransomware among files using information that is not included in content of the files, the files are determined based on (e.g., based at least in part on) at least one file-related operation being performed on each of the files during a session of a cloud-based application. A subset of the files is determined such that each file in the subset has multiple file extensions during the session. A value, which is based on a number of the files in the subset, is compared to a threshold. A determination is made whether the files include the ransomware based on whether the value is greater than or equal to the threshold. For instance, the value being greater than or equal to the threshold may indicate that the files include the ransomware, and the value being less than the threshold may indicate that the files do not include the ransomware. An alert, which indicates that the files include the ransomware, is selectively triggered based on detection of whether the files include the ransomware. For example, the alert may be triggered based on detection that the files include the ransomware; the alert may not be triggered based on detection that the files do not include the ransomware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
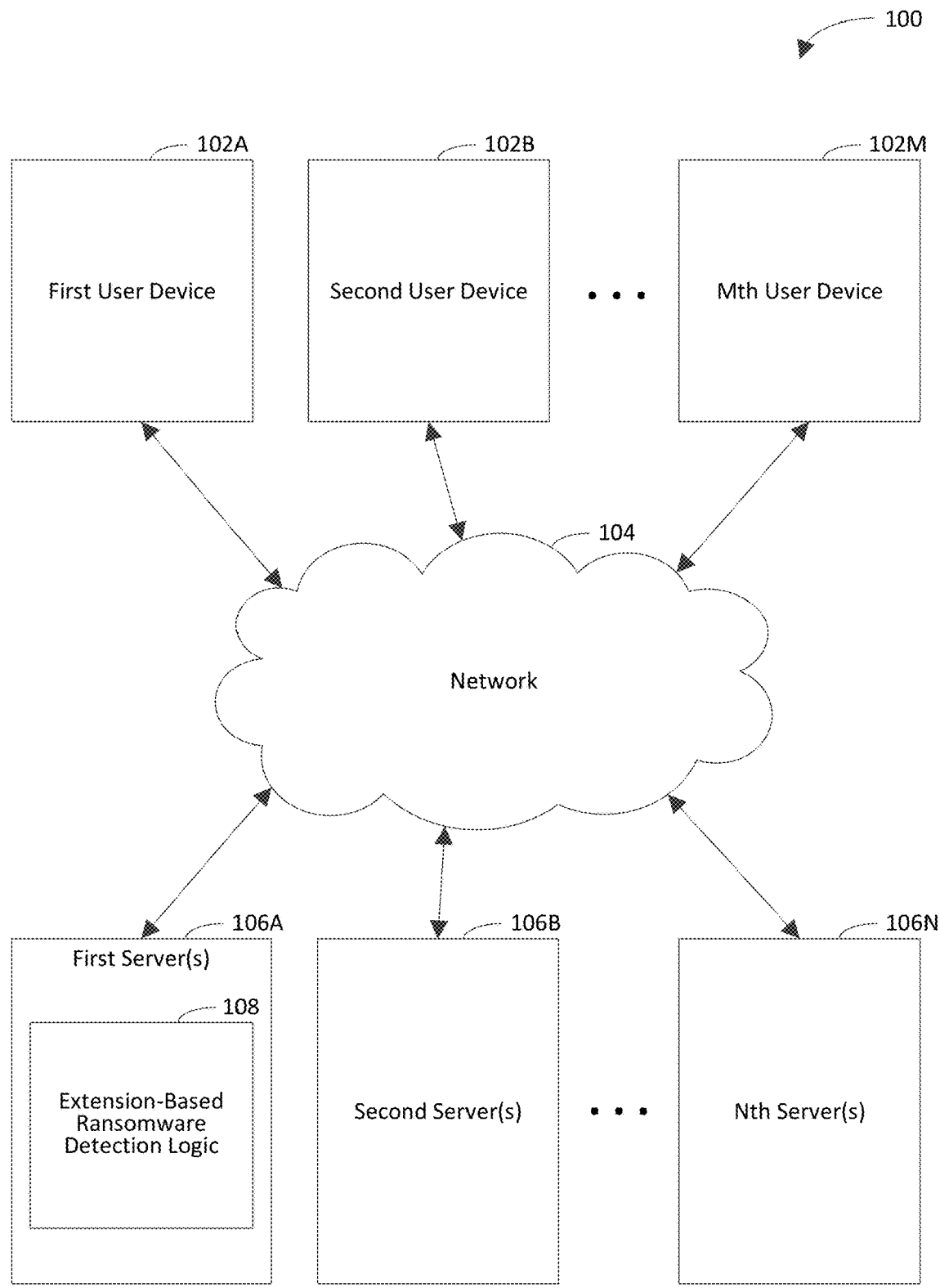
FIG. 1 is a block diagram of an example extension-based ransomware detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of detecting ransomware among files using information that is not included in content of the files. For instance, the information may indicate that file-related operations have been performed on the files during a period of time and that one or more of the files has had multiple file extensions during the period of time. A file-related operation is an operation that is performed on a file. Examples of a file-related operation include but are not limited to upload, download, edit, rename, delete, and sync to cloud. A file may have one or more filenames. A filename of a file includes a body and one or more extensions. The body precedes the extensions. For example, if the filename is "file_name.ext," "file_name" is the body, and ".ext" is the extension. A filename of a file (or any portion of the filename) does not constitute content of the file.

Multiple file extensions of a file may be concatenated to provide a multiple-concatenated file extension. For example, a file that has a filename of "file_name.txt.encrypt" has a body of "file_name" and a multiple-concatenated file extension of ".txt.encrypt." An extension that is relatively closer to the body of the filename is referred to as an inner extension, and an extension that is relatively farther from the body of the filename is referred to as an outer extension. Accordingly, in this example, ".txt" is referred to as the inner extension, and ".encrypt" is referred to as the outer extension. A multiple-concatenated file extension may include any suitable number (e.g., 2, 3, 4, or 5) of file extensions that are concatenated.

Multiple file extensions of a file may occur (e.g., be used) in respective events. For instance, a file may have a first extension of ".txt" during a first event and a second extension of ".encrypt" during a second event. An event is an action or occurrence that is recognized by software (e.g., a cloud-based application). For example, the software may handle the event and/or generate a message indicating that the event has occurred. Events often originate asynchronously from an external environment, which is external to the software. Examples of an event include but are not limited to a file-related operation (as described above) and a login. The file extension that occurs in each event may be a multiple-concatenated file extension or a simple file extension. A simple file extension is a file extension that does not include multiple concatenated file extensions. Examples of a simple file extension include but are not limited to ".txt", ".encrypt", ".pdf", ".docx", and ".html".

In an example scenario, a ransomware attack is characterized by multiple events related to file editing occurring in a relatively short period of time during a session (e.g., a batch of events within a designated time frame). A group of files and an additional instruction file are used in the ransomware attack. Each file in the group has a file extension that is gibberish. The instruction file has a different common extension (.txt), and the body of the filename of the instruction file is gibberish. None of the aforementioned features of the files indicates directly that the files in the group are encrypted and that the ransomware attack occurred during the session. By utilizing one or more of the example techniques described herein, an anomalous pattern may be detected. For instance, the features may be analyzed to determine that the ransomware attack occurred during the session.

Example techniques described herein have a variety of benefits as compared to conventional techniques for detecting ransomware. For instance, the example techniques may be capable of detecting ransomware among files using information that is not included in content of the files. For example, the information that is not included in the content of the files may be used in addition to or in lieu of information that is included in the content of the files to detect the ransomware. Accordingly, the example techniques need not necessarily analyze the content of the files to detect the ransomware. The example techniques may detect the ransomware independently from the content of the files. By detecting ransomware among files that are processed and/or stored by a computing system, the example techniques may be capable of increasing security of the computing system. The example techniques may provide greater security of a computing system than conventional techniques that detect ransomware because the example techniques may be capable of detecting the ransomware more quickly, efficiently, and/or accurately than the conventional techniques.

The example techniques may detect ransomware in files based on operation logs that identify file-related operations that are performed on the files. For instance, the operation logs may be generated by a cloud-based application. The operation logs need not necessarily identify specific file-related operations. For instance, the example techniques may detect the ransomware using information regarding arbitrary file-related operations in the operation logs. The example techniques need not necessarily rely on specific file extensions, specific additional files added by an attacker, and/or attackers' custom signatures (e.g., style, wording).

The example techniques may reduce an amount of time and/or resources (e.g., processor cycles, memory, network bandwidth) that is consumed to detect ransomware. For instance, by analyzing information that is not included in content of files to determine whether the files include a ransomware, time and/or resources associated with analyzing content of the files may not be consumed. The example techniques may thereby reduce a cost associated with detecting the ransomware. For example, a cost may be attributed to the time and/or resources that are to be consumed to analyze the content of the files. By not consuming such time and/or resources, the attributed cost may be saved. The example techniques may increase efficiency of a computing system that is used to detect the ransomware. The example techniques may increase efficiency of a user of a computing system that detects the ransomware. For example, by detecting the ransomware in accordance with one or more of the example techniques described herein, a ransomware attack may be avoided. By avoiding the ransomware attack, consumption of time and/or resources associated with recovering from the ransomware attack may be avoided, and downtime of the user may be reduced. The example techniques may thereby increase efficiency of the user.

FIG. 1 is a block diagram of an example extension-based ransomware detection system 100 in accordance with an embodiment. Generally speaking, the extension-based ransomware detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the extension-based ransomware detection system 100 detects ransomware among files using information that is not included in content of the files. Detail regarding techniques for detecting ransomware among files using information that is not included in content of the files is provided in the following discussion.

As shown in FIG. 1, the extension-based ransomware detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Each of the computer programs may be referred to as a cloud-based application. A cloud-based application is an application that is hosted on one or more servers (e.g., one or more of the servers 106A-106N). Accordingly, the cloud-based application may execute at least partially (e.g., entirely) on the server(s), which may operate as a single networked ecosystem. In accordance with some example embodiments, the servers 106A-106N are configured to host respective Web sites, so that the Web sites are accessible to users of the extension-based ransomware detection system 100.

The first server(s) 106A are shown to include extension-based ransomware detection logic 108 for illustrative purposes. The extension-based ransomware detection logic 108 is configured to detect ransomware among files using information that is not included in content of the files. In an example implementation, the extension-based ransomware detection logic 108 determines the files based on (e.g., based at least in part on) at least one file-related operation being performed on each of the files during a session of a cloud-based application. The extension-based ransomware detection logic 108 determines a subset of the files such that each file in the subset has multiple file extensions during the session. The extension-based ransomware detection logic 108 compares a value, which is based on a number of the files in the subset, to a threshold. The extension-based ransomware detection logic 108 determines whether the files include the ransomware based on whether the value is greater than or equal to the threshold. For instance, the value being greater than or equal to the threshold may indicate that the files include the ransomware, and the value being less than the threshold may indicate that the files do not include the ransomware. The extension-based ransomware detection logic 108 selectively triggers an alert, which indicates that the files include the ransomware, based on detection of whether the files include the ransomware. For example, the extension-based ransomware detection logic 108 may be configured to trigger the alert based on detection that the files include the ransomware, and the extension-based ransomware detection logic 108 may be further configured to not trigger the alert based on detection that the files do not include the ransomware.

The extension-based ransomware detection logic 108 may be implemented in various ways to detect ransomware among files using information that is not included in content of the files, including being implemented in hardware, software, firmware, or any combination thereof. For example, the extension-based ransomware detection logic 108 may be implemented as computer program code configured to be executed in one or more processors. In another example, at least a portion of the extension-based ransomware detection logic 108 may be implemented as hardware logic/electrical circuitry. For instance, at least a portion of the extension-based ransomware detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The extension-based ransomware detection logic 108 is shown to be incorporated in the first server(s) 106A for illustrative purposes and is not intended to be limiting. It will be recognized that the extension-based ransomware detection logic 108 (or any portion(s) thereof) may be incorporated in any one or more of the user devices 102A-102M. For example, client-side aspects of the extension-based ransomware detection logic 108 may be incorporated in one or more of the user devices 102A-102M, and server-side aspects of extension-based ransomware detection logic 108 may be incorporated in the first server(s) 106A. In another example, the extension-based ransomware detection logic 108 may be distributed among the user devices 102A-102M. In yet another example, the extension-based ransomware detection logic 108 may be incorporated in a single one of the user devices 102A-102M. In another example, the extension-based ransomware detection logic 108 may be distributed among the server(s) 106A-106N. In still another example, the extension-based ransomware detection logic 108 may be incorporated in a single one of the servers 106A-106N.

Figure 2:
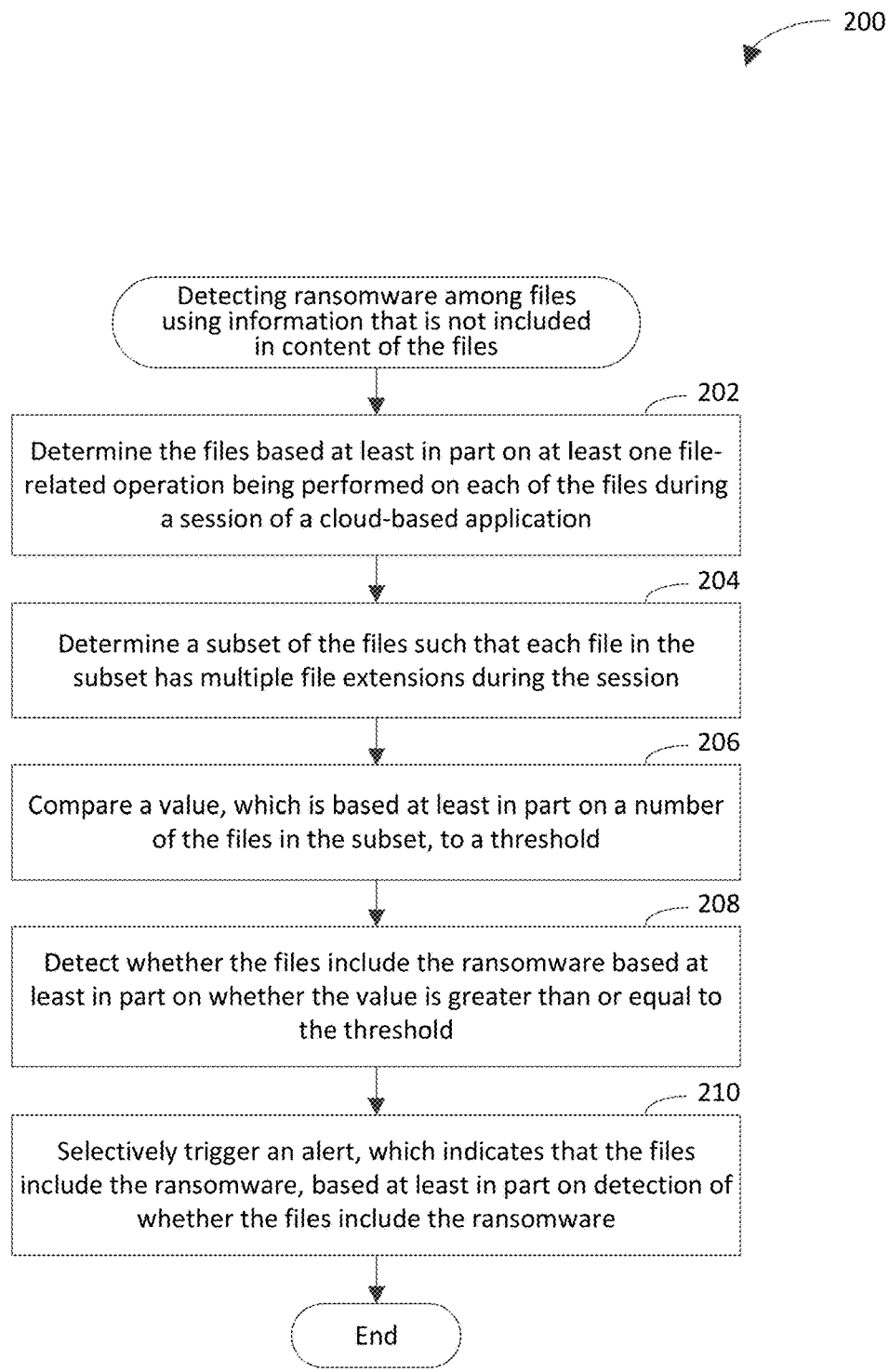
FIGS. 2-4 depict flowcharts of example methods for detecting ransomware among files using information that is not included in content of the files in accordance with embodiments.
Figure 3:
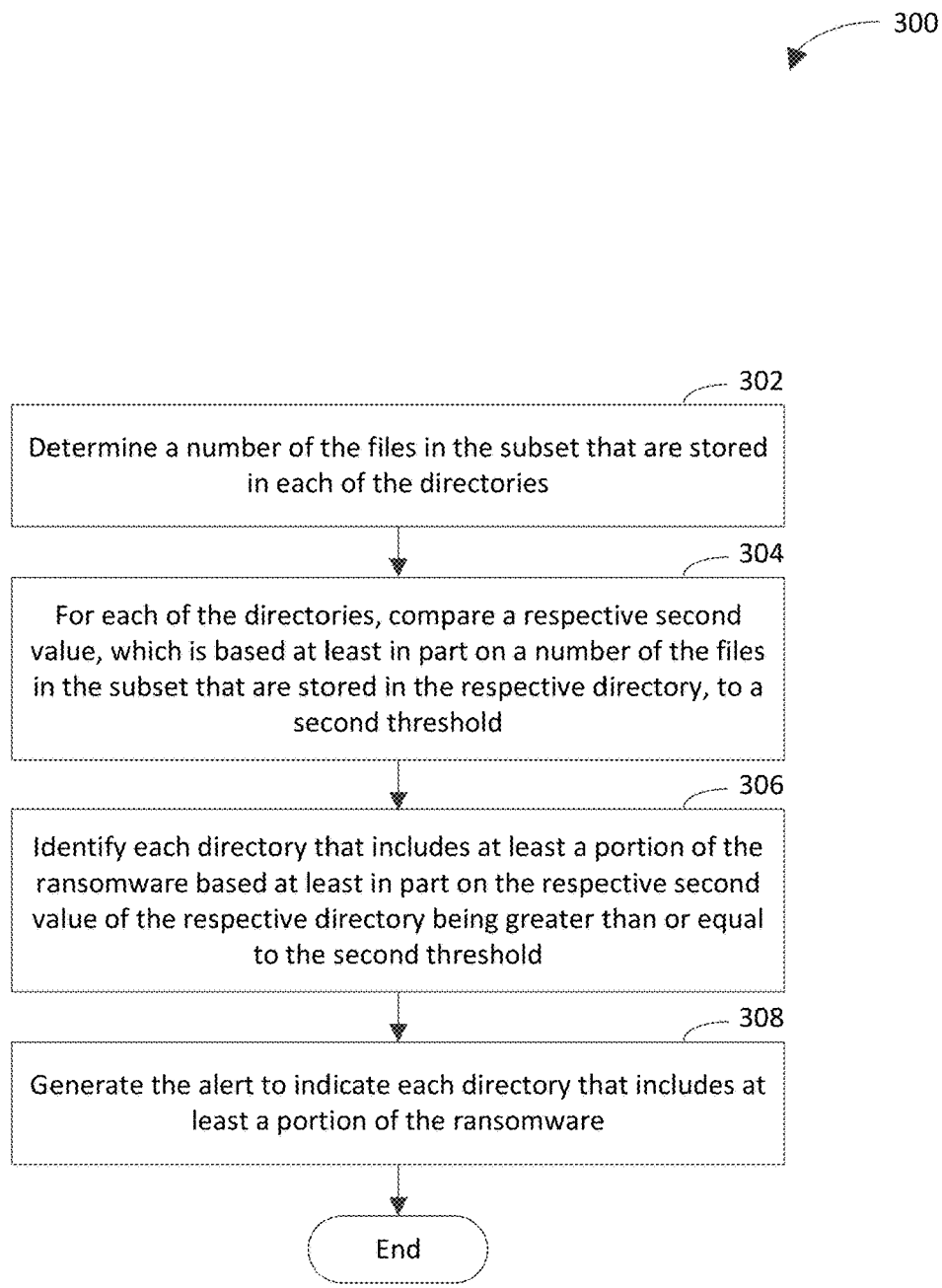
Figure 4:
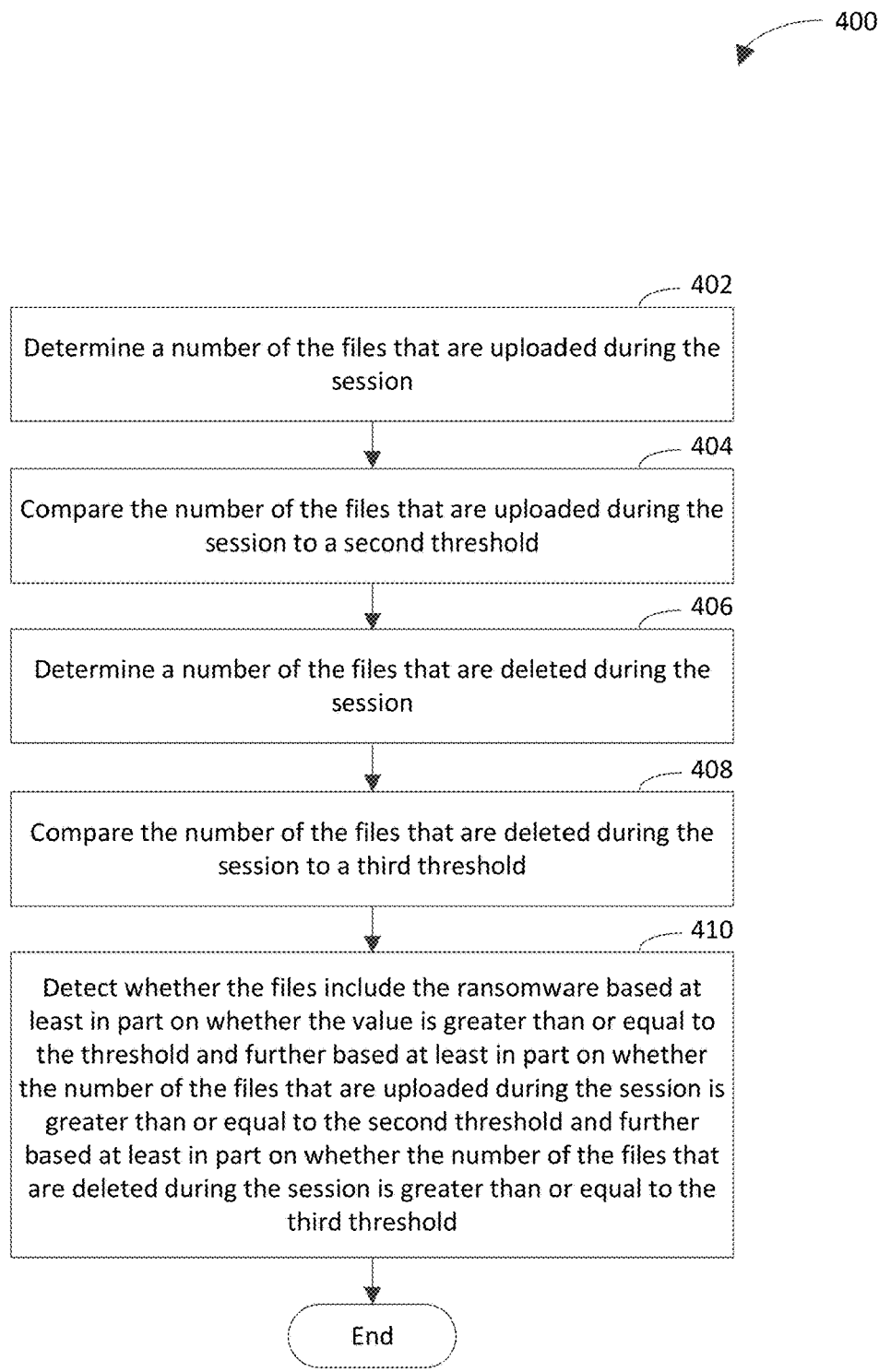
Figure 5:
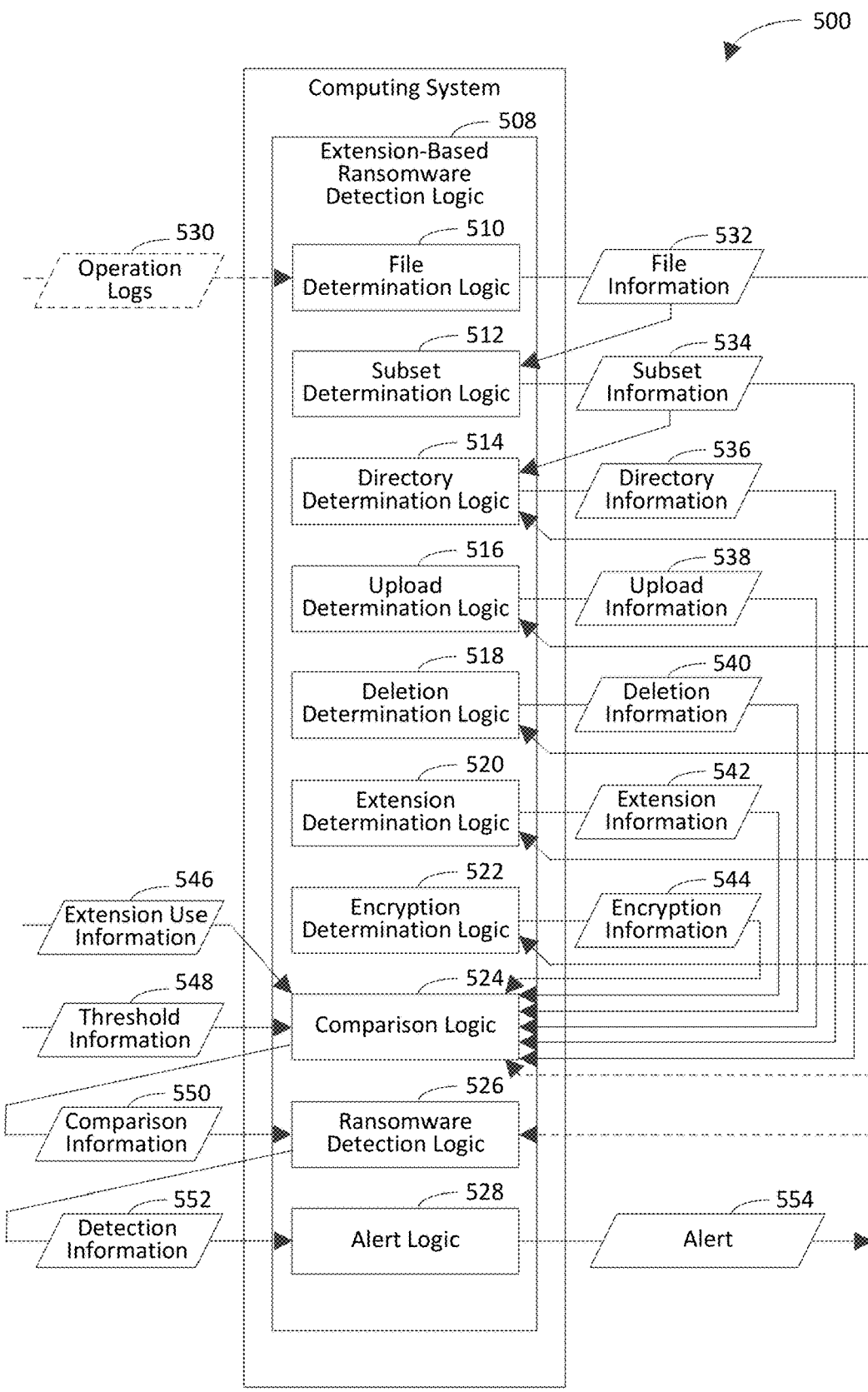
FIG. 5 is a block diagram of an example computing system in accordance with an embodiment.

FIGS. 2-4 depict flowcharts 200, 300, and 400 of example methods for detecting ransomware among files using information that is not included in content of the files in accordance with embodiments. Flowcharts 200, 300, and 400 may be performed by the first server(s) 106A, shown in FIG. 1, for example. For illustrative purposes, flowcharts 200, 300, and 400 are described with respect to computing system 500 shown in FIG. 5, which is an example implementation of the first server(s) 106A. As shown in FIG. 5, the computing system 500 includes extension-based ransomware detection logic 508. The extension-based ransomware detection logic 508 includes file determination logic 510, subset determination logic 512, directory determination logic 514, upload determination logic 516, deletion determination logic 518, extension determination logic 520, encryption determination logic 522, comparison logic 524, ransomware detection logic 526, and alert logic 528. Further structural and operational embodiments will be apparent to persons skilled in the relevant art(s) based on the discussion regarding flowcharts 200, 300, and 400.

As shown in FIG. 2, the method of flowchart 200 begins at step 202. In step 202, the files are determined based at least in part on at least one file-related operation being performed on each of the files during a session of a cloud-based application. The session is defined by a period of time between a start time and an end time. For example, determining the files at step 202 may include monitoring a corpus of files during the period to identify which of the files has been a subject of at least one file-related operation. In accordance with this example, the files that are determined at step are those from the corpus that have been a subject of at least one file-related operation. In an example implementation, the file determination logic 510 determines the files. The file determination logic 510 may generate file information 532 to identify the files. For instance, the file information 532 may indicate (e.g., specify) a filename of each of the files. Each filename may include a body and one or more extensions. The file determination logic 510 may generate the file information 532 to further indicate (e.g., include) other information, including but not limited to a number of the files, the file-related operation(s) that are performed on each file during the session, and a number of the file-related operation(s) that are performed on each file during the session.

The session may last for any suitable amount of time. The duration of the session may be predetermined or may be determined on the fly. For example, the duration of the session may a be predetermined, fixed amount of time (e.g., 1 hour, 2 hours, or 2.5 hours). In another example, the duration of the session may be a variable amount of time that depends on one or more criteria. For instance, the session may be scheduled to end when a designated number (e.g., 100, 1000, or 1250) of file-related operations have been detected or within a threshold amount of time (e.g., 1 hour, 2 hours, or 2.5 hours). The session may be scheduled to end based on whichever of the aforementioned criteria comes first. In yet another example, the duration of the session initially may be set to be a fixed amount of time, but the duration of the session may thereafter be extended beyond the fixed amount of time based on detection of further events. For instance, the session may be configured to not end so long as an amount of time between consecutive file-related operations is less than or equal to a threshold amount of time. The end time of the session may be determined retroactively based on passage of a specified amount of time (e.g., 24 hours). For example, the session may remain open through for the specified amount of time to determine whether file-related operations that related to previously detected file-related operations are detected. In accordance with this example, if no such file-related operations are detected, the end time of the session may be established to be a time instant at which the most recent file-related operation was detected or a time instance at which a threshold amount of time ends.

At step 204, a subset of the files is determined such that each file in the subset has multiple file extensions during the session. In an example implementation, the subset determination logic 512 determines the subset. For example, the subset determination logic 512 may analyze the file information to identify the files and to determine which of the files has multiple file extensions during the session. In accordance with this example, the subset determination logic 512 may select only the files that have multiple file extensions during the session to be included in the subset. Accordingly, the subset determination logic 512 may not select the files that do not have multiple file extensions during the session to be included in the subset. The subset determination logic 512 may generate subset information 534 to indicate the files that are included in the subset. For instance, the subset information 534 may indicate a filename of each of the files in the subset. Each filename may include a body and one or more extensions. The subset determination logic 512 may generate the subset information to further indicate other information, including but not limited to a number of the files in the subset, a number of extensions that each file in the subset has during the session, and a ratio of the number of the files in the subset to the number of the files that are determined at step 202.

In an example embodiment, determining the subset of the files at step 204 includes determining that identified file(s) are to be included in the subset based at least in part on each of the identified file(s) having multiple file extensions in respective events during the session. For example, a determination may be made that a first identified file is to be included in the subset based at least in part on the first identified file having a ".docx" file extension when the first identified file is uploaded to a store and further based at least in part on the first identified file having a ".html" file extension when the first identified file is edited. In another example, a determination may be made that a second identified file is to be included in the subset based at least in part on the second identified file having a ".pdf encrypt" multiple-concatenated file extension when the second identified file is downloaded to a user device and further based at least in part on the second identified file having a ".pdf" file extension when the second identified file is deleted.

In accordance with this embodiment, determining that the identified files are to be included in the subset is further based at least in part on the multiple file extensions of each identified file having a first extension that is used as an extension for a file during a plurality of sessions (e.g., previous sessions, which are prior to the session that is defined by the period of time between the start time and the end time) a number of times that is greater than or equal to a second threshold number of times and further based at least in part on the multiple file extensions of each identified file having a second extension that is used as an extension for a file during the plurality of sessions a number of times that is less than or equal to a third threshold number of times. For instance, it may be desirable for the first extension of each identified file to be relatively common among the plurality of sessions and for the second extension of the respective file to be relatively uncommon among the plurality of sessions. For example, a common file extension may be a file extension that is included in the 100 most commonly used extensions during the sessions, and an uncommon file extension may be a file extension that is not included in the 100 most commonly used extensions during the sessions. Examples of a common file extension may include .txt, .html, .doc, .docx, .xls, .xlsx, .ppt, .pptm, .pptx, .pdf, .gdoc, .gslides, .gsheet, and .gdraw. Examples of an uncommon file extension may include .url and .key. The second threshold number of times and the third threshold number of times may be same or different. For example, a determination may be made that the identified file(s) are to be included in the subset based at least in part on each identified file having a respective first extension that is used by any one or more files at least 100 times during the sessions and further based at least in part on the respective identified file having a respective second extension that is used by any one or more files no more than 30 times during the sessions.

In another example embodiment, determining the subset of the files at step 204 includes determining that identified file(s) are to be included in the subset based at least in part on each of the identified file(s) having a multiple-concatenated file extension during the session. For example, a first identified file may be included in the subset as a result of the first identified file having a ".xlsx.html" multiple-concatenated file extension during the session. In another example, a second identified file may be included in the subset as a result of the second identified file having a ".pdf.key" multiple-concatenated file extension during the session.

In an aspect of this embodiment, determining that the identified file(s) are to be included in the subset is further based at least in part on the multiple-concatenated file extension of each identified file having an inner extension that is used as an extension for a file during a plurality of sessions a number of times that is greater than or equal to a second threshold number of times and further based at least in part on the multiple-concatenated file extension of each identified file having an outer extension that is used as an extension for a file during the plurality of sessions a number of times that is less than or equal to a third threshold number of times. For instance, it may be desirable for the inner extension of each identified file to be relatively common among the plurality of sessions and for the outer extension of the respective file to be relatively uncommon among the plurality of sessions. The second threshold number of times and the third threshold number of times may be same or different. For example, a determination may be made that the identified file(s) are to be included in the subset based at least in part on each identified file having a respective inner extension that is used by any one or more files at least 150 times during the sessions and further based at least in part on the respective identified file having a respective outer extension that is used by any one or more files no more than 50 times during the sessions.

In an example of this aspect, determining that the identified file(s) are to be included in the subset is further based at least in part on the inner extension of each identified file being used as an extension for a file among multiple (e.g., all) tenants of the cloud-based application during the plurality of sessions a number of times that is greater than or equal to the second threshold number of times and further based at least in part on the outer extension of each identified file being used as an extension for a file among the multiple tenants of the cloud-based application during the plurality of sessions a number of times that is less than or equal to the third threshold number of times. In accordance with this example, each tenant includes multiple users who share a common access to the cloud-based application. For example, it may be desirable for the inner extension of each identified file to be relatively common among the tenants during the sessions and for the outer extension of the respective file to be relatively uncommon among the tenants during the sessions. In accordance with this example, a common file extension may be a file extension that is included in the 100 most commonly used extensions for all tenants of the cloud-based application, and an uncommon file extension may be a file extension that is not included in the 100 most commonly used extensions for all tenants of the cloud-based application.

In another example of this aspect, determining that the identified file(s) are to be included in the subset is further based at least in part on the inner extension of each identified file being used as an extension for a file by a tenant, which is selected from a plurality of tenants of the cloud-based application, during the plurality of sessions a number of times that is greater than or equal to the second threshold number of times and further based at least in part on the outer extension of each identified file being used as an extension for a file by the tenant during the plurality of sessions a number of times that is less than or equal to the third threshold number of times. In accordance with this example, each tenant includes multiple users who share a common access to the cloud-based application. For instance, it may be desirable for the inner extension of each identified file to be commonly used by the tenant during the sessions and for the outer extension of the respective file to not be commonly used by the tenant during the sessions.

At step 206, a value, which is based at least in part on a number of the files in the subset, is compared to a threshold. In an example implementation, the comparison logic 524 compares the value to the threshold. The comparison logic 524 may determine the threshold based at least in part on threshold information 548 indicating the threshold. The threshold information 548 may be stored locally by the computing system 500 or retrieved from a remote store that is external to the computing system 500. In accordance with this implementation, the comparison logic 524 determines the value based at least in part on the subset information 534. For example, the value may be based on (e.g., may be equal to) the number of the files in the subset or the ratio of the number of the files in the subset to the number of the files that are determined at step 202. In accordance with this example, the comparison logic 524 may determine the value based at least in part on the subset information 534 indicating the number of the files in the subset or the ratio of the number of the files in the subset to the number of the files that are determined at step 202. The comparison logic 524 may generate comparison information 550 to indicate whether the value is greater than or equal to the threshold. For instance, the comparison information 550 may include a first character (e.g., number, letter, or symbol) or string of characters based on the value being greater than or equal to the threshold or a second character or string of characters based on the value being less than the threshold.

At step 208, whether the files include the ransomware is detected based at least in part on whether the value is greater than or equal to the threshold. In an example implementation, ransomware detection logic 526 detects (e.g., determines) whether the files include the ransomware based at least in part on whether the comparison information 550 indicates that the value is greater than or equal to the threshold. For example, the ransomware detection logic 526 may detect that the files include the ransomware based at least in part on the comparison information 550 indicating that the value is greater than or equal to the threshold. In another example, the ransomware detection logic 526 may detect that the files do not include the ransomware based at least in part on the comparison information 550 indicating that the value is less than the threshold. The ransomware detection logic 526 may generate detection information 552 to indicate whether the files include the ransomware. For instance, the ransomware detection logic 526 may include a first character or string of characters based on detection that the files include the ransomware, or a second character or string of characters based on detection that the files do not include the ransomware.

In an example embodiment, detecting whether the files include the ransomware at step 208 includes detecting, independently from the content of the files, that the files include the ransomware based at least in part on the value being greater than or equal to the threshold. For instance, the determination may be made without consideration of the content of the files.

In another example embodiment, detecting whether the files include the ransomware at step 208 is further based at least in part on whether the files include an instruction file, which indicates a manner in which payment is to be made to enable decryption of files that have been encrypted by the ransomware. For example, the instruction file may instruct a recipient of the instruction file to purchase gift cards and to provide identifiers associated with the gift cards to a requestor so that the requestor may use the identifiers to extract funds associated with the gift cards from account(s) in which the funds are stored. The instruction file may be identified in any of a variety of ways. For example, the instruction file may be identified based on the instruction file being the only file in a directory that is not encrypted. In another example, the instruction file may be identified based on a filename (or portion thereof) of the instruction file. For instance, the instruction file may be identified based on the body of the filename of the instruction file being "PayMe-Now," "ReadMeNow," a relatively uncommon name (e.g., not in top 100 most common across multiple sessions), or gibberish (e.g., meaningless combination of letters, numbers, and/or symbols). The instruction file may be identified based on the file extension of the instruction file being .txt, .html, .url, or .key. In an example implementation, the ransomware detection logic 526 analyzes the file information 532 to determine whether the files include an instruction file. For instance, the file information 532 may include metadata (e.g., file extensions) associated with the files, which may indicate whether any of the files is an instruction file. Accordingly, the ransomware detection logic 526 may review the metadata associated with the files in the file information 532 to determine whether the files include an instruction file.

In yet another example embodiment, a first file, which is included in the subset of the files, is stored in a directory. In accordance with this embodiment, detecting whether the files include the ransomware at step 208 is further based at least in part on whether the directory in which the first file is stored includes an instruction file, which indicates a manner in which payment is to be made to enable decryption of files that have been encrypted by the ransomware.

In still another example embodiment, the subset of the files includes first file(s) stored in one or more directories. In accordance with this embodiment, detecting whether the files include the ransomware at step 208 is further based at least in part on a number of the one or more directories in which the first file(s) are stored that include an instruction file. Each instruction file indicates a manner in which payment is to be made to enable decryption of files that have been encrypted by the ransomware.

At step 210, an alert, which indicates that the files include the ransomware, is selectively triggered based at least in part on detection of whether the files include the ransomware. In an example implementation, the alert logic 528 selectively triggers an alert 554, which indicates that the files include the ransomware, based on the detection information 552. For example, the alert logic 528 may be configured to trigger the alert 554 based at least in part on the detection information 552 indicating that the files include the ransomware. Triggering the alert 554 may include initiating and/or providing the alert 554. In another example, the alert logic 528 may be configured to not trigger the alert 554 based at least in part on the detection information 552 indicating that the files do not include the ransomware.

It will be recognized that selectively triggering the alert to a user may be dependent on whether an alert has been previously sent to the user (e.g., within a specified period of time). For instance, if an alert regarding ransomware was sent to the user 5 minutes ago, the alert at step 210 may not be sent to the user, or the alert at step 210 may be sent to the user following a specified amount of time (e.g., 10 minutes) with reference to a time instance at which the previous alert was sent to the user.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, comparing the value to the threshold at step 206 includes comparing the number of the files in the subset to the threshold. In accordance with this embodiment, detecting whether the files include the ransomware is based at least in part on whether the number of the files in the subset is greater than or equal to the threshold. The threshold may be any suitable number of files (e.g., 35 files, 100 files, or 200 files). For example, the number of the files in the subset being greater than or equal to the threshold may weigh in favor of detecting that the files include the ransomware; whereas, the number of the files in the subset being less than the threshold may weigh in favor of detecting that the files do not include the ransomware. For instance, if the sole criterion for detecting whether the files include the ransomware is whether the number of the files in the subset is greater than or equal to the threshold, the number of the files in the subset being greater than or equal to the threshold may result in automatically detecting that the files include the ransomware, and the number of the files in the subset being less than the threshold may result in automatically detecting that the files do not include the ransomware. It will be recognized that detecting whether the files include the ransomware may be based on any suitable criteria, any suitable number of criteria, etc.

For instance, in an aspect of this embodiment, the method of flowchart 200 further includes determining a ratio of the number of the files in the subset to a number of the files that are determined at step 202. For instance, the subset determination logic 512 may determine the ratio. The subset determination logic 512 may analyze the file information 532 to determine the number of the files and to further determine the number of the files in the subset. The subset determination logic 512 may divide the number of the files in the subset by the number of the files to determine the ratio. The subset determination logic 512 may generate the subset information 534 to indicate the ratio. In accordance with this aspect, the method of flowchart 200 further includes comparing the ratio to a second threshold. For instance, the comparison logic 524 may compare the ratio to the second threshold. The threshold information 548 may indicate the second threshold. The comparison logic 524 may analyze the threshold information 548 to determine the second threshold. The comparison logic 524 may analyze the subset information 534 to identify the ratio that is indicated by the subset information 534 and then compare the identified ratio to the second threshold. The comparison logic 524 may compare the ratio to the second threshold in response to (e.g., based on) receipt of the subset information 534 and further in response to receipt of the threshold information 548 (e.g., based on the subset information 534 indicating the ratio and further based on the threshold information 548 indicating the second threshold). The comparison logic 524 may generate the comparison information 550 to indicate whether the number of the files in the subset is greater than or equal to the threshold and to further indicate whether the ratio is greater than or equal to the second threshold. In further accordance with this aspect, detecting whether the files include the ransomware at step 208 includes detecting whether the files include the ransomware based at least in part on whether the number of the files in the subset is greater than or equal to the threshold and further based at least in part on whether the ratio is greater than or equal to the second threshold. For instance, the ransomware detection logic 526 may detect whether the files include the ransomware based at least in part on whether the comparison information 550 indicates that the number of the files in the subset is greater than or equal to the threshold and further based at least in part on whether the comparison information 550 indicates that the ratio is greater than or equal to the second threshold.

In an example of this aspect, the ratio being greater than or equal to the second threshold may weigh in favor of detecting that the files include the ransomware; whereas, the ratio being less than the second threshold may weigh in favor of detecting that the files do not include the ransomware. In accordance with this example, detecting whether the files include the ransomware at step 208 may include detecting that the files include the ransomware based at least in part on the number of the files in the subset being greater than or equal to the threshold (a.k.a. "first threshold") and further based at least in part on the ratio being greater than or equal to the second threshold. In further accordance with this example, detecting whether the files include the ransomware at step 208 may include detecting that the files do not include the ransomware based at least in part on the number of the files in the subset being less than the first threshold and/or based at least in part on the ratio being less than the second threshold.

It will be recognized that the second threshold may be any suitable proportion (e.g., percentage), such as 50%, 65%, 80%, or 85%. For example, the first threshold and the second threshold may be inversely proportional. In accordance with this example, as the first threshold is increased, the second threshold may be decreased (e.g., linearly or exponentially). In an example implementation, the first and second thresholds may be 100 files and 80%, respectively, for a first session; 125 files and 64%, respectively, for a second session; 200 files and 40%, respectively, for a third session, and so on. In another example implementation, the first and second thresholds may be 90 files and 85%, respectively, for a first session; 120 files and 75%, respectively, for a second session; 135 files and 68% for a third session, and so on.

In another example embodiment, the method of flowchart 200 further includes determining a ratio of the number of the files in the subset to a number of the files that are determined at step 202. For instance, the subset determination logic 512 may determine the ratio. In accordance with this embodiment, comparing the value to the threshold at step 206 includes comparing the ratio to the threshold. In further accordance with this embodiment, detecting whether the files include the ransomware at step 208 is based at least in part on whether the ratio is greater than or equal to the threshold. For example, the ratio being greater than or equal to the threshold may weigh in favor of detecting that the files include the ransomware; whereas, the ratio being less than the threshold may weigh in favor of detecting that the files do not include the ransomware.

In yet another example embodiment, the method of flowchart 200 further includes receiving logs that are initiated based at least in part on respective file-related operations being performed on the respective files during the session. For instance, the file determination logic 510 may receive operation logs 530, which are initiated based at least in part on the respective file-related operations being performed on the respective files during the session. In accordance with this embodiment, determining the files at step 202 includes analyzing the logs to identify the respective files based at least in part on indicators in the respective logs indicating the respective files. For example, a first log may include a first indicator; a second log may include a second indicator; a third log may include a third indicator, and so on. In accordance with this example, the file determination logic 510 may analyze the first log to identify a first file based at least in part on the first indicator specifying the first file; the file determination logic 510 may analyze the second log to identify a second file based at least in part on the second indicator specifying the second file; the file determination logic 510 may analyze the third log to identify a third file based at least in part on the third indicator specifying the third file, and so on.

In still another example embodiment, the method of flowchart 200 further includes determining a number of the files that include at least one known ransomware extension. Each known ransomware extension is an extension that has been identified as having a likelihood of being used in a previous ransomware attack that is greater than or equal to a second threshold. For example, the extension determination logic 520 may determine the number of the files that include at least one known ransomware extension. In accordance with this example, the extension determination logic 520 may analyze the file information 532 to determine the number of the files that include at least one known ransomware extension. In a cross-referencing implementation, the extension determination logic 520 may cross-reference extensions of the files with a list of known ransomware extensions to determine which of the files has at least one known ransomware extension from the list. The extension determination logic 520 may initialize a counter to have an initial value (e.g., zero) when the session begins and then increment the value of the counter (e.g., by one) for each file that is determined to have at least one known ransomware extension from the list during the session. The extension determination logic 520 may determine the number of the files that include at least one known ransomware extension based on the value of the counter at the end of the session. For instance, the number of the files that include at least one known ransomware extension may be equal to the value of the counter at the end of the session. The extension determination logic 520 may generate extension information 542 to indicate the number of the files that include at least one known ransomware extension. In accordance with this embodiment, detecting whether the files include the ransomware at step 208 is further based at least in part on whether the number of the files that include at least one known ransomware extension is greater than or equal to a third threshold. For example, the comparison logic 524 may analyze the extension information 542 to determine the number of the files that include at least one known ransomware extension. In accordance with this example, the comparison logic 524 may compare the number of the files that include at least one known ransomware extension to the third threshold and generate the comparison information 550 to include information regarding the comparison. In further accordance with this example, the ransomware detection logic 526 may detect whether the files include the ransomware based at least in part on whether the comparison information 550 indicates that the number of the files that include at least one known ransomware extension is greater than or equal to the third threshold. For instance, the number of the files that include at least one known ransomware extension being greater than or equal to the third threshold may weigh in favor of detecting that the files include the ransomware; whereas, the number of the files that include at least one known ransomware extension being less than the third threshold may weigh in favor of detecting that the files do not include the ransomware. The third threshold may be inversely proportional to the number of criteria that are used to detect whether the files include the ransomware. For instance, as the number of the criteria is increased, the third threshold may be decreased (e.g., linearly or exponentially), and vice versa.

In another example embodiment, the method of flowchart 200 further includes determining a number of the files that are encrypted. Determining whether a file is encrypted may be performed in any of a variety of ways. For example, a determination may be made that the file is encrypted based on the file having a multiple-concatenated file extension. In another example, content of the file may be analyzed to determine that the file is encrypted. In accordance with this example, analysis of the content may reveal attributes of the file that are characteristic of an encrypted file. A determination may be made that the file is encrypted based on the attributes being characteristic of an encrypted file. In an example, the encryption determination logic 522 may determine the number of the files that are encrypted. In accordance with this example, the encryption determination logic 522 may analyze the content of the files and/or metadata (e.g., file extensions) associated with the files to determine which of the files are encrypted. In further accordance with this example, the encryption determination logic 522 may count the number of files that are determined to be encrypted and then generate encryption information 544 to indicate the number of the files that are encrypted. In accordance with this embodiment, detecting whether the files include the ransomware is further based at least in part on whether the number of the files that are encrypted is greater than or equal to a second threshold. For instance, the number of the files that are encrypted being greater than or equal to the second threshold may weigh in favor of detecting that the files include the ransomware; whereas, the number of the files that are encrypted being less than the second threshold may weigh in favor of detecting that the files do not include the ransomware. For example, the comparison logic 524 may analyze the encryption information 544 to determine the number of the files that are encrypted. In accordance with this example, the comparison logic 524 may compare the number of the files that are encrypted to the second threshold and generate the comparison information 550 to include information regarding the comparison. In further accordance with this example, the ransomware detection logic 526 may detect whether the files include the ransomware based at least in part on whether the comparison information 550 indicates that the number of the files that are encrypted is greater than or equal to the second threshold.

In yet another example embodiment, the method of flowchart 200 further includes one or more of the steps shown in flowchart 300 of FIG. 3. In the embodiment of FIG. 3, the files are stored among directories. As shown in FIG. 3, the method of flowchart 300 begins at step 302. In step 302, a number of the files in the subset that are stored in each of the directories is determined. In an example implementation, the directory determination logic 514 determines the number of the files in the subset that are stored in each of the directories. For example, the directory determination logic 514 may analyze the subset information 534 to determine the files that are included in the subset. The directory determination logic 514 may analyze the file information 532 to determine which of the files are stored in each directory. For instance, the file information 532 may associate identifiers with the respective directories and assign, to each file, an identifier associated with each directory in which the file is stored. The directory determination logic 514 may determine the files stored in each directory based at least in part on the files being assigned the respective identifier associated with the respective directory. The directory determination logic 514 may cross-reference the files that are included in the subset, as indicated by the subset information 534, with the files that are stored in each of the directories, as determined by the directory determination logic 514, to determine which of the files in the subset are stored in each of the directories. The directory determination logic 514 may generate directory information 536 to indicate the number of the files in the subset that are stored in each of the directories.

At step 304, for each of the directories, a respective second value is compared to a second threshold. Each second value is based at least in part on a number of the files in the subset that are stored in the respective directory. In an example implementation, the comparison logic 524 compares the second value for each directory to the second threshold. The comparison logic 524 may analyze the directory information 536 to determine the second value for each directory. For example, the comparison logic 524 may determine the second value for each directory based at least in part on the directory information 536 indicating the number of the files in the subset that are stored in the respective directory. The threshold information 548 may indicate the second threshold. The comparison logic 524 may analyze the threshold information 548 to determine the second threshold. The comparison logic 524 may generate the comparison information 550 to indicate whether the second value for each directory is greater than or equal to the second threshold.

At step 306, each directory that includes at least a portion of the ransomware is identified based at least in part on the respective second value of the respective directory being greater than or equal to the second threshold. For instance, step 306 may include distinguishing each directory for which the respective second value is greater than the second threshold from directories for which the respective second values are not greater than the second threshold. In an example implementation, the ransomware detection logic 526 identifies each directory that includes at least a portion of the ransomware based at least in part on the comparison information 550 indicating whether the second value for each directory is greater than or equal to the second threshold. For example, the comparison information 550 may indicate each directory for which the respective second value is greater than or equal to the second threshold. In accordance with this example, the ransomware detection logic 526 may identify each directory that includes at least a portion of the ransomware based at least in part on the comparison information 550 indicating that the respective second value is greater than or equal to the second threshold. The ransomware detection logic 526 may generate the detection information 552 to indicate each directory that includes at least a portion of the ransomware.

At step 308, the alert is generated to indicate each directory that includes at least a portion of the ransomware. In an example implementation, the alert logic 528 generates the alert 554 to indicate each directory that includes at least a portion of the ransomware. For example, the alert logic 528 may analyze the detection information 552 to determine which of the directories include at least a portion of the ransomware. In accordance with this example, the alert logic 528 may generate the alert 554 based at least in part on the detection information 552 indicating each directory that includes at least a portion of the ransomware.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, for each of the directories, comparing the respective second value to the second threshold at step 304 includes, for each of the directories, comparing the number of the files in the subset that are stored in the respective directory to the second threshold. In accordance with this embodiment, identifying each directory that includes at least a portion of the ransomware at step 306 is based at least in part on the number of the files in the subset that are stored in the respective directory being greater than or equal to the second threshold.

In an aspect of this embodiment, the method of flowchart 300 further includes, for each of the directories, determining a ratio of the number of the files in the subset that are stored in the respective directory to a number of the files that are determined at step 202 and that are stored in the respective directory. In an example implementation, the subset determination logic 512 determines the ratio for each directory. In accordance with this implementation, the subset determination logic 512 may generate the subset information 534 to indicate the ratio for each directory. In accordance with this aspect, the method of flowchart 300 further includes, for each of the directories, comparing the respective ratio to a third threshold. In an example implementation, the comparison logic 524 compares the ratio for each directory to the third threshold and generates the comparison information 550 to include information regarding the comparison. For instance, the comparison logic 524 may analyze the subset information 534 to determine the ratio for each directory. The threshold information 548 may indicate the third threshold. The comparison logic 524 may analyze the threshold information 548 to determine the third threshold. The comparison logic 524 may compare the ratio for each directory to the third threshold in response to (e.g., based on) receipt of the subset information 534 and further in response to receipt of the threshold information 548 (e.g., based on the subset information 534 indicating the ratio for each directory and further based on the threshold information 548 indicating the third threshold). The comparison logic 524 may generate the comparison information 550 to indicate whether the ratio for each directory is greater than or equal to the third threshold. In further accordance with this aspect, identifying each directory that includes at least a portion of the ransomware at step 306 is based at least in part on the number of the files in the subset that are stored in the respective directory being greater than or equal to the second threshold and further based at least in part on the respective ratio being greater than or equal to the third threshold. In an example implementation, the ransomware detection logic 526 identifies each directory that includes at least a portion of the ransomware based at least in part on the comparison logic 550 indicating that the number of the files in the subset that are stored in the respective directory is greater than or equal to the second threshold and further based at least in part on the comparison logic 550 indicating that the respective ratio for the respective directory is greater than or equal to the third threshold.

In another example embodiment, the method of flowchart 300 further includes, for each of the directories, determining a ratio of the number of the files in the subset that are stored in the respective directory to a number of the files that are determined at step 202 and that are stored in the respective directory. In an example implementation, the subset determination logic 512 determines the ratio for each directory. For instance, the subset determination logic 512 may generate the subset information 534 to indicate the ratio for each directory. In accordance with this embodiment, for each of the directories, comparing the respective second value to the second threshold at step 304 includes, for each of the directories, comparing the respective ratio to the second threshold. In further accordance with this embodiment, identifying each directory that includes at least a portion of the ransomware at step 306 is based at least in part on the respective ratio being greater than or equal to the second threshold.

In yet another example embodiment, identifying each directory that includes at least a portion of the ransomware at step 306 is based at least in part on the respective second value of the respective directory being greater than or equal to the second threshold and further based at least in part on the respective directory including an instruction file, which indicates a manner in which payment is to be made to enable decryption of files that have been encrypted by the ransomware. In an example implementation, the ransomware detection logic 526 analyzes the file information 532 to determine which of the directories include an instruction file. For instance, the file information 532 may include metadata (e.g., file extensions) associated with the files in each directory. The ransomware detection logic 526 may determine whether each directory includes an instruction file based at least in part on the metadata associated with the files in the respective directory.

In still another example embodiment, the method of flowchart 200 further includes one or more of the steps shown in flowchart 400 of FIG. 4. As shown in FIG. 4, the method of flowchart 400 begins at step 402. In step 402, a number of the files that are uploaded during the session is determined. In an example implementation, the upload determination logic 516 determines the number of the files that are uploaded during the session. For example, the file information 532 may indicate events that are performed during the session. In accordance with this example, the file information 532 may indicate file-related operation(s) that are performed (e.g., on each file) during the session. In further accordance with this example, the upload determination logic 516 may analyze the file information 532 to determine which of the files are uploaded during the session. The upload determination logic 516 may initialize a counter to an initial value (e.g., zero) and increment the value of the counter by one for each file that the upload determination logic 516 determines to have been uploaded during the session. The upload determination logic 516 determines the number of files that are uploaded during the session to be equal to the value of the counter when the upload determination logic 516 finishes determining whether each of the files was uploaded during the session. The upload determination logic 516 may generate upload information 538 to indicate the number of the files that are uploaded during the session.

At step 404, the number of the files that are uploaded during the session is compared to a second threshold. In an example implementation, the comparison logic 524 compares the number of the files that are uploaded during the session to the second threshold. For instance, the threshold information 548 may indicate the second threshold. The comparison logic 524 may analyze the threshold information 548 to determine second threshold. The comparison logic 524 may analyze the upload information 538 to determine the number of the files that are uploaded during the session. The comparison logic 524 may compare the number of the files that are uploaded during the session to the second threshold in response to receipt of the upload information 538 and further in response to receipt of the threshold information 548 (e.g., based on the upload information 538 indicating the number of the files that are uploaded during the session and further based on the threshold information 548 indicating the second threshold). The comparison logic 524 may generate the comparison information 550 to indicate whether the number of the files that are uploaded during the session is greater than or equal to the second threshold.

At step 406, a number of the files that are deleted during the session is determined. In an example implementation, the deletion determination logic 518 determines the number of the files that are deleted during the session. For example, the deletion determination logic 518 may analyze the file information 532 to determine which of the files are deleted during the session. The deletion determination logic 518 may initialize a counter to an initial value (e.g., zero) and increment the value of the counter by one for each file that the deletion determination logic 518 determines to have been deleted during the session. The deletion determination logic 518 determines the number of files that are deleted during the session to be equal to the value of the counter when the deletion determination logic 518 finishes determining whether each of the files was deleted during the session. The deletion determination logic 518 may generate deletion information 540 to indicate the number of the files that are deleted during the session.

At step 408, the number of the files that are deleted during the session is compared to a third threshold. In an example implementation, the comparison logic 524 compares the number of the files that are deleted during the session to the third threshold. For instance, the threshold information 548 may indicate the third threshold. The comparison logic 524 may analyze the threshold information 548 to determine third threshold. The comparison logic 524 may analyze the deletion information 540 to determine the number of the files that are deleted during the session. The comparison logic 524 may compare the number of the files that are deleted during the session to the third threshold in response to receipt of the deletion information 540 and further in response to receipt of the threshold information 548 (e.g., based on the deletion information 540 indicating the number of the files that are deleted during the session and further based on the threshold information 548 indicating the third threshold). The comparison logic 524 may generate the comparison information 550 to further indicate whether the number of the files that are deleted during the session is greater than or equal to the third threshold.

At step 410, whether the files include the ransomware is detected based at least in part on whether the value is greater than or equal to the threshold (a.k.a. "first threshold") and further based at least in part on whether the number of the files that are uploaded during the session is greater than or equal to the second threshold and further based at least in part on whether the number of the files that are deleted during the session is greater than or equal to the third threshold. For example, the value being greater than or equal to the first threshold may weigh in favor of detecting that the files include the ransomware; whereas, the value being less than the first threshold may weigh in favor of detecting that the files do not include the ransomware. In another example, the number of the files that are uploaded during the session being greater than or equal to the second threshold may weigh in favor of detecting that the files include the ransomware; whereas, the number of the files that are uploaded during the session being less than the second threshold may weigh in favor of detecting that the files do not include the ransomware. In yet another example, the number of the files that are deleted during the session being greater than or equal to the third threshold may weigh in favor of detecting that the files include the ransomware; whereas, the number of the files that are deleted during the session being less than the third threshold may weigh in favor of detecting that the files do not include the ransomware. In an example implementation, the ransomware detection logic 526 detects whether the files include the ransomware based at least in part on whether the subset information 534 indicates that the value is greater than or equal to the first threshold and further based at least in part on whether the upload information 538 indicates that the number of the files that are uploaded during the session is greater than or equal to the second threshold and further based at least in part on whether the deletion information 540 indicates that the number of the files that are deleted during the session is greater than or equal to the third threshold.

It will be recognized that the computing system 500 may not include one or more of the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, and/or the alert logic 528. Furthermore, the computing system 500 may include components in addition to or in lieu of the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, and/or the alert logic 528.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the extension-based ransomware detection logic 108, the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, the alert logic 528, flowchart 200, flowchart 300, and/or flowchart 400 may be implemented in hardware, software, firmware, or any combination thereof.

For example, any one or more of the extension-based ransomware detection logic 108, the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, the alert logic 528, flowchart 200, flowchart 300, and/or flowchart 400 may be implemented, at least in part, as computer program code configured to be executed in one or more processors.

In another example, any one or more of the extension-based ransomware detection logic 108, the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, the alert logic 528, flowchart 200, flowchart 300, and/or flowchart 400 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
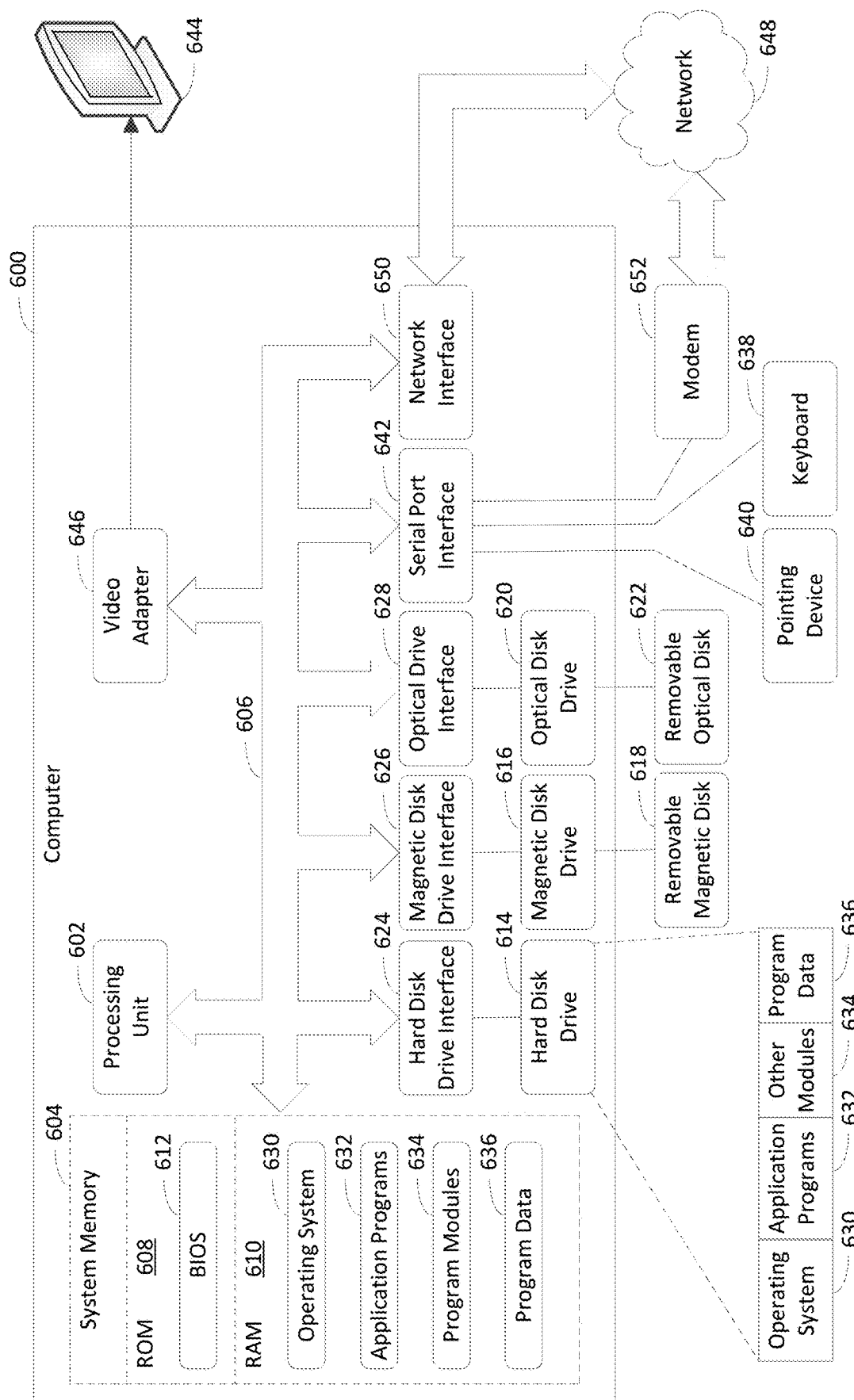
FIG. 6 depicts an example computer in which embodiments may be implemented.

III. Further Discussion of Some Example Embodiments (A1) An example system (FIG. 1, 102A-102M or 106A-106N; FIG. 5, 500; FIG. 6, 600) to detect ransomware among a plurality of files using information that is not included in content of the plurality of files comprises memory (FIG. 6, 604, 608, 610) and one or more processors (FIG. 6, 602) coupled to the memory. The one or more processors are configured to determine (FIG. 2, 202) the plurality of files based at least in part on at least one file-related operation being performed on each of the plurality of files during a session of a cloud-based application. The session is defined by a period of time between a start time and an end time. The one or more processors are further configured to determine (FIG. 2, 204) a subset of the plurality of files such that each file in the subset has multiple file extensions during the session. The one or more processors are further configured to compare (FIG. 2, 206) a value, which is based at least in part on a number of the files in the subset, to a threshold. The one or more processors are further configured to detect (FIG. 2, 208) whether the plurality of files includes the ransomware based at least in part on whether the value is greater than or equal to the threshold. The one or more processors are further configured to selectively trigger (FIG. 2, 210) an alert (FIG. 5, 554), which indicates that the plurality of files includes the ransomware, based at least in part on detection of whether the plurality of files includes the ransomware.

(A2) In the example system of A1, wherein the one or more processors are configured to: compare the number of the files in the subset to the threshold; and detect whether the plurality of files includes the ransomware based at least in part on whether the number of the files in the subset is greater than or equal to the threshold.

(A3) In the example system of any of A1-A2, wherein the one or more processors are configured to: determine a ratio of the number of the files in the subset to a number of the plurality of files; compare the ratio to a second threshold; and detect whether the plurality of files includes the ransomware based at least in part on whether the number of the files in the subset is greater than or equal to the threshold and further based at least in part on whether the ratio is greater than or equal to the second threshold.

(A4) In the example system of any of A1-A3, wherein the one or more processors are configured to: determine a ratio of the number of the files in the subset to a number of the plurality of files; compare the ratio to the threshold; and detect whether the plurality of files includes the ransomware based at least in part on whether the ratio is greater than or equal to the threshold.

(A5) In the example system of any of A1-A4, wherein the one or more processors are configured to: determine that one or more first files are to be included in the subset based at least in part on each of the one or more first files having multiple file extensions in respective events during the session.

(A6) In the example system of any of A1-A5, wherein the one or more processors are configured to: determine that the one or more first files are to be included in the subset further based at least in part on the multiple file extensions of each first file having a first extension that is used as an extension for a file during a plurality of sessions a number of times that is greater than or equal to a second threshold number of times and further based at least in part on the multiple file extensions of each first file having a second extension that is used as an extension for a file during the plurality of sessions a number of times that is less than or equal to a third threshold number of times.

(A7) In the example system of any of A1-A6, wherein the one or more processors are configured to: determine that one or more first files are to be included in the subset based at least in part on each of the one or more first files having a multiple-concatenated file extension during the session.

(A8) In the example system of any of A1-A7, wherein the one or more processors are configured to: determine that the one or more first files are to be included in the subset further based at least in part on the multiple-concatenated file extension of each first file having an inner extension that is used as an extension for a file during a plurality of sessions a number of times that is greater than or equal to a second threshold number of times and further based at least in part on the multiple-concatenated file extension of each first file having an outer extension that is used as an extension for a file during the plurality of sessions a number of times that is less than or equal to a third threshold number of times.

(A9) In the example system of any of A1-A8, wherein the one or more processors are configured to: determine that the one or more first files are to be included in the subset further based at least in part on the inner extension of each first file being used as an extension for a file among a plurality of tenants of the cloud-based application during the plurality of sessions a number of times that is greater than or equal to the second threshold number of times and further based at least in part on the outer extension of each first file being used as an extension for a file among the plurality of tenants of the cloud-based application during the plurality of sessions a number of times that is less than or equal to the third threshold number of times, each tenant including a plurality of users who share a common access to the cloud-based application.

(A10) In the example system of any of A1-A9, wherein the one or more processors are configured to: determine that the one or more first files are to be included in the subset further based at least in part on the inner extension of each first file being used as an extension for a file by a tenant, which is selected from a plurality of tenants of the cloud-based application, during the plurality of sessions a number of times that is greater than or equal to the second threshold number of times and further based at least in part on the outer extension of each first file being used as an extension for a file by the tenant during the plurality of sessions a number of times that is less than or equal to the third threshold number of times, each tenant including a plurality of users who share a common access to the cloud-based application.

(A11) In the example system of any of A1-A10, wherein the one or more processors are configured to: detect, independently from the content of the plurality of files, that the plurality of files includes the ransomware based at least in part on the value being greater than or equal to the threshold.

(A12) In the example system of any of A1-A11, wherein the one or more processors are configured to: receive a plurality of logs that are initiated based at least in part on a plurality of respective file-related operations being performed on the plurality of respective files during the session; and analyze the plurality of logs to identify the plurality of respective files based at least in part on a plurality of indicators in the plurality of respective logs indicating the plurality of respective files.

(A13) In the example system of any of A1-A12, wherein the one or more processors are configured to: detect whether the plurality of files includes the ransomware further based at least in part on whether the plurality of files includes an instruction file, which indicates a manner in which payment is to be made to enable decryption of files that have been encrypted by the ransomware.

(A14) In the example system of any of A1-A13, wherein a first file that is included in the subset of the plurality of files is stored in a directory; and wherein the one or more processors are configured to: detect whether the plurality of files includes the ransomware further based at least in part on whether the directory in which the first file is stored includes an instruction file, which indicates a manner in which payment is to be made to enable decryption of files that have been encrypted by the ransomware.

(A15) In the example system of any of A1-A14, wherein the subset of the plurality of files includes one or more first files stored in one or more directories; and wherein the one or more processors are configured to: detect whether the plurality of files includes the ransomware further based at least in part on a number of the one or more directories in which the one or more first files are stored that include an instruction file, each instruction file indicating a manner in which payment is to be made to enable decryption of files that have been encrypted by the ransomware.

(A16) In the example system of any of A1-A15, wherein the plurality of files are stored among a plurality of directories; and wherein the one or more processors are configured to: determine a number of the files in the subset that are stored in each of the plurality of directories; for each of the plurality of directories, compare a respective second value, which is based at least in part on a number of the files in the subset that are stored in the respective directory, to a second threshold; identify each directory that includes at least a portion of the ransomware based at least in part on the respective second value of the respective directory being greater than or equal to the second threshold; and generate the alert to indicate each directory that includes at least a portion of the ransomware.

(A17) In the example system of any of A1-A16, wherein the one or more processors are configured to: for each of the plurality of directories, compare the number of the files in the subset that are stored in the respective directory to the second threshold; and identify each directory that includes at least a portion of the ransomware based at least in part on the number of the files in the subset that are stored in the respective directory being greater than or equal to the second threshold.

(A18) In the example system of any of A1-A17, wherein the one or more processors are configured to: for each of the plurality of directories, determine a ratio of the number of the files in the subset that are stored in the respective directory to a number of the plurality of files that are stored in the respective directory; for each of the plurality of directories, compare the respective ratio to a third threshold; and identify each directory that includes at least a portion of the ransomware based at least in part on the number of the files in the subset that are stored in the respective directory being greater than or equal to the second threshold and further based at least in part on the respective ratio being greater than or equal to the third threshold.

(A19) In the example system of any of A1-A18, wherein the one or more processors are configured to: for each of the plurality of directories, determine a ratio of the number of the files in the subset that are stored in the respective directory to a number of the plurality of files that are stored in the respective directory; for each of the plurality of directories, compare the respective ratio to the second threshold; and identify each directory that includes at least a portion of the ransomware based at least in part on the respective ratio being greater than or equal to the second threshold.

(A20) In the example system of any of A1-A19, wherein the one or more processors are configured to: identify each directory that includes at least a portion of the ransomware based at least in part on the respective second value of the respective directory being greater than or equal to the second threshold and further based at least in part on the respective directory including an instruction file, which indicates a manner in which payment is to be made to enable decryption of files that have been encrypted by the ransomware.

(A21) In the example system of any of A1-A20, wherein the one or more processors are configured to: determine a number of the plurality of files that are uploaded during the session; compare the number of the plurality of files that are uploaded during the session to a second threshold; determine a number of the plurality of files that are deleted during the session; compare the number of the plurality of files that are deleted during the session to a third threshold; and detect whether the plurality of files includes the ransomware further based at least in part on whether the number of the plurality of files that are uploaded during the session is greater than or equal to the second threshold and further based at least in part on whether the number of the plurality of files that are deleted during the session is greater than or equal to the third threshold.

(A22) In the example system of any of A1-A21, wherein the one or more processors are configured to: determine a number of the plurality of files that include at least one known ransomware extension, wherein each known ransomware extension is an extension that has been identified as having a likelihood of being used in a previous ransomware attack that is greater than or equal to a second threshold; and detect whether the plurality of files includes the ransomware further based at least in part on whether the number of the plurality of files that include at least one known ransomware extension is greater than or equal to a third threshold.

(A23) In the example system of any of A1-A22, wherein the one or more processors are configured to: determine a number of the plurality of files that are encrypted; and detect whether the plurality of files includes the ransomware further based at least in part on whether the number of the plurality of files that are encrypted is greater than or equal to a second threshold.

(B1) An example method of detecting ransomware among a plurality of files using information that is not included in content of the plurality of files, the method implemented by a computing system (FIG. 1, 102A-102M or 106A-106N; FIG. 5, 500; FIG. 6, 600), comprises: determining (FIG. 2, 202) the plurality of files based at least in part on at least one file-related operation being performed on each of the plurality of files during a session of a cloud-based application, the session defined by a period of time between a start time and an end time; determining (FIG. 2, 204) a subset of the plurality of files such that each file in the subset has multiple file extensions during the session; comparing (FIG. 2, 206) a value, which is based at least in part on a number of the files in the subset, to a threshold; detecting (FIG. 2, 208) whether the plurality of files includes the ransomware based at least in part on whether the value is greater than or equal to the threshold; and selectively triggering (FIG. 2, 210) an alert (FIG. 5, 554), which indicates that the plurality of files includes the ransomware, based at least in part on detection of whether the plurality of files includes the ransomware.

(B2) In the method of B1, wherein comparing the value to the threshold comprises: comparing the number of the files in the subset to the threshold; and wherein detecting whether the plurality of files includes the ransomware comprises: detecting whether the plurality of files includes the ransomware based at least in part on whether the number of the files in the subset is greater than or equal to the threshold.

(B3) In the method of any of B1-B2, further comprising: determining a ratio of the number of the files in the subset to a number of the plurality of files; and comparing the ratio to a second threshold; wherein detecting whether the plurality of files includes the ransomware comprises: detecting whether the plurality of files includes the ransomware based at least in part on whether the number of the files in the subset is greater than or equal to the threshold and further based at least in part on whether the ratio is greater than or equal to the second threshold.

(B4) In the method of any of B1-B3, further comprising: determining a ratio of the number of the files in the subset to a number of the plurality of files; wherein comparing the value to the threshold comprises: comparing the ratio to the threshold; and wherein detecting whether the plurality of files includes the ransomware comprises: detecting whether the plurality of files includes the ransomware based at least in part on whether the ratio is greater than or equal to the threshold.

(B5) In the method of any of B1-B4, wherein determining the subset of the plurality of files comprises: determining that one or more first files are to be included in the subset based at least in part on each of the one or more first files having multiple file extensions in respective events during the session.

(B6) In the method of any of B1-B5, wherein determining that the one or more first files are to be included in the subset comprises: determining that the one or more first files are to be included in the subset further based at least in part on the multiple file extensions of each first file having a first extension that is used as an extension for a file during a plurality of sessions a number of times that is greater than or equal to a second threshold number of times and further based at least in part on the multiple file extensions of each first file having a second extension that is used as an extension for a file during the plurality of sessions a number of times that is less than or equal to a third threshold number of times.

(B7) In the method of any of B1-B6, wherein determining the subset of the plurality of files comprises: determining that one or more first files are to be included in the subset based at least in part on each of the one or more first files having a multiple-concatenated file extension during the session.

(B8) In the method of any of B1-B7, wherein determining that the one or more first files are to be included in the subset comprises: determining that the one or more first files are to be included in the subset further based at least in part on the multiple-concatenated file extension of each first file having an inner extension that is used as an extension for a file during a plurality of sessions a number of times that is greater than or equal to a second threshold number of times and further based at least in part on the multiple-concatenated file extension of each first file having an outer extension that is used as an extension for a file during the plurality of sessions a number of times that is less than or equal to a third threshold number of times.

(B9) In the method of any of B1-B8, wherein determining that the one or more first files are to be included in the subset comprises: determining that the one or more first files are to be included in the subset further based at least in part on the inner extension of each first file being used as an extension for a file among a plurality of tenants of the cloud-based application during the plurality of sessions a number of times that is greater than or equal to the second threshold number of times and further based at least in part on the outer extension of each first file being used as an extension for a file among the plurality of tenants of the cloud-based application during the plurality of sessions a number of times that is less than or equal to the third threshold number of times, each tenant including a plurality of users who share a common access to the cloud-based application.

(B10) In the method of any of B1-B9, wherein determining that the one or more first files are to be included in the subset comprises: determining that the one or more first files are to be included in the subset further based at least in part on the inner extension of each first file being used as an extension for a file by a tenant, which is selected from a plurality of tenants of the cloud-based application, during the plurality of sessions a number of times that is greater than or equal to the second threshold number of times and further based at least in part on the outer extension of each first file being used as an extension for a file by the tenant during the plurality of sessions a number of times that is less than or equal to the third threshold number of times, each tenant including a plurality of users who share a common access to the cloud-based application.

(B11) In the method of any of B1-B10, wherein detecting whether the plurality of files includes the ransomware comprises: detecting, independently from the content of the plurality of files, that the plurality of files includes the ransomware based at least in part on the value being greater than or equal to the threshold.

(B12) In the method of any of B1-B11, further comprising: receiving a plurality of logs that are initiated based at least in part on a plurality of respective file-related operations being performed on the plurality of respective files during the session; wherein determining the plurality of files comprises: analyzing the plurality of logs to identify the plurality of respective files based at least in part on a plurality of indicators in the plurality of respective logs indicating the plurality of respective files.

(B13) In the method of any of B1-B12, wherein detecting whether the plurality of files includes the ransomware comprises: detecting whether the plurality of files includes the ransomware further based at least in part on whether the plurality of files includes an instruction file, which indicates a manner in which payment is to be made to enable decryption of files that have been encrypted by the ransomware.

(B14) In the method of any of B1-B13, wherein a first file that is included in the subset of the plurality of files is stored in a directory; and wherein detecting whether the plurality of files includes the ransomware comprises: detecting whether the plurality of files includes the ransomware further based at least in part on whether the directory in which the first file is stored includes an instruction file, which indicates a manner in which payment is to be made to enable decryption of files that have been encrypted by the ransomware.

(B15) In the method of any of B1-B14, wherein the subset of the plurality of files includes one or more first files stored in one or more directories; and wherein detecting whether the plurality of files includes the ransomware comprises: detecting whether the plurality of files includes the ransomware further based at least in part on a number of the one or more directories in which the one or more first files are stored that include an instruction file, each instruction file indicating a manner in which payment is to be made to enable decryption of files that have been encrypted by the ransomware.

(B16) In the method of any of B1-B15, wherein the plurality of files are stored among a plurality of directories; wherein the method further comprises: determining a number of the files in the subset that are stored in each of the plurality of directories; for each of the plurality of directories, comparing a respective second value, which is based at least in part on a number of the files in the subset that are stored in the respective directory, to a second threshold; and identifying each directory that includes at least a portion of the ransomware based at least in part on the respective second value of the respective directory being greater than or equal to the second threshold; and wherein selectively triggering the alert comprises: generating the alert to indicate each directory that includes at least a portion of the ransomware.

(B17) In the method of any of B1-B16, wherein, for each of the plurality of directories, comparing the respective second value to the second threshold comprises: for each of the plurality of directories, comparing the number of the files in the subset that are stored in the respective directory to the second threshold; and wherein identifying each directory that includes at least a portion of the ransomware comprises: identifying each directory that includes at least a portion of the ransomware based at least in part on the number of the files in the subset that are stored in the respective directory being greater than or equal to the second threshold.

(B18) In the method of any of B1-B17, further comprising: for each of the plurality of directories, determining a ratio of the number of the files in the subset that are stored in the respective directory to a number of the plurality of files that are stored in the respective directory; and for each of the plurality of directories, comparing the respective ratio to a third threshold; wherein identifying each directory that includes at least a portion of the ransomware comprises: identifying each directory that includes at least a portion of the ransomware based at least in part on the number of the files in the subset that are stored in the respective directory being greater than or equal to the second threshold and further based at least in part on the respective ratio being greater than or equal to the third threshold.

(B19) In the method of any of B1-B18, further comprising: for each of the plurality of directories, determining a ratio of the number of the files in the subset that are stored in the respective directory to a number of the plurality of files that are stored in the respective directory; wherein, for each of the plurality of directories, comparing the respective second value to the second threshold comprises: for each of the plurality of directories, comparing the respective ratio to the second threshold; and wherein identifying each directory that includes at least a portion of the ransomware comprises: identifying each directory that includes at least a portion of the ransomware based at least in part on the respective ratio being greater than or equal to the second threshold.

(B20) In the method of any of B1-B19, wherein identifying each directory that includes at least a portion of the ransomware comprises: identifying each directory that includes at least a portion of the ransomware based at least in part on the respective second value of the respective directory being greater than or equal to the second threshold and further based at least in part on the respective directory including an instruction file, which indicates a manner in which payment is to be made to enable decryption of files that have been encrypted by the ransomware.

(B21) In the method of any of B1-B20, further comprising: determining a number of the plurality of files that are uploaded during the session; comparing the number of the plurality of files that are uploaded during the session to a second threshold; determining a number of the plurality of files that are deleted during the session; and comparing the number of the plurality of files that are deleted during the session to a third threshold; wherein detecting whether the plurality of files includes the ransomware comprises: detecting whether the plurality of files includes the ransomware further based at least in part on whether the number of the plurality of files that are uploaded during the session is greater than or equal to the second threshold and further based at least in part on whether the number of the plurality of files that are deleted during the session is greater than or equal to the third threshold.

(B22) In the method of any of B1-B21, further comprising: determining a number of the plurality of files that include at least one known ransomware extension, wherein each known ransomware extension is an extension that has been identified as having a likelihood of being used in a previous ransomware attack that is greater than or equal to a second threshold; wherein detecting whether the plurality of files includes the ransomware comprises: detecting whether the plurality of files includes the ransomware further based at least in part on whether the number of the plurality of files that include at least one known ransomware extension is greater than or equal to a third threshold.

(B23) In the method of any of B1-B22, further comprising: determining a number of the plurality of files that are encrypted; wherein detecting whether the plurality of files includes the ransomware comprises: detecting whether the plurality of files includes the ransomware further based at least in part on whether the number of the plurality of files that are encrypted is greater than or equal to a second threshold.

(C1) An example computer program product (FIG. 6, 618, 622) comprising a computer-readable storage medium having instructions recorded thereon for enabling a processor-based system (FIG. 1, 102A-102M or 106A-106N; FIG. 5, 500; FIG. 6, 600) to perform operations to detect ransomware among a plurality of files using information that is not included in content of the plurality of files, the operations comprising: determining (FIG. 2, 202) the plurality of files based at least in part on at least one file-related operation being performed on each of the plurality of files during a session of a cloud-based application, the session defined by a period of time between a start time and an end time; determining (FIG. 2, 204) a subset of the plurality of files such that each file in the subset has multiple file extensions during the session; comparing (FIG. 2, 206) a value, which is based at least in part on a number of the files in the subset, to a threshold; detecting (FIG. 2, 208) whether the plurality of files includes the ransomware based at least in part on whether the value is greater than or equal to the threshold; and selectively triggering (FIG. 2, 210) an alert (FIG. 5, 554), which indicates that the plurality of files includes the ransomware, based at least in part on detection of whether the plurality of files includes the ransomware.

IV. Example Computer System

FIG. 6 depicts an example computer 600 in which embodiments may be implemented. Any one or more of the user devices 102A-102M and/or any one or more of the servers 106A-106N shown in FIG. 1 and/or computing system 500 shown in FIG. 5 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the extension-based ransomware detection logic 108, the extension-based ransomware detection logic 508, the file determination logic 510, the subset determination logic 512, the directory determination logic 514, the upload determination logic 516, the deletion determination logic 518, the extension determination logic 520, the encryption determination logic 522, the comparison logic 524, the ransomware detection logic 526, the alert logic 528, flowchart 200 (including any step of flowchart 200), flowchart 300 (including any step of flowchart 300), and/or flowchart 400 (including any step of flowchart 400), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to detect ransomware among a plurality of files using information that is not included in content of the plurality of files, the system comprising:
  memory; and
  a processing system coupled to the memory, the processing system configured to:
    determine the plurality of files based at least in part on a file-related operation being performed on each of the plurality of files during a session of a cloud-based application, the session defined by a period of time between a start time and an end time;
    determine a subset of the plurality of files such that each file in the subset has multiple file extensions during the session, determination of the subset comprising:
      determine that a first file has multiple file extensions in respective events during the session;
      determine that the multiple file extensions have a first extension that is used as an extension for a file during a plurality of sessions a number of times that is greater than or equal to a first threshold number of times; and
      determine that the multiple file extensions have a second extension that is used as an extension for a file during the plurality of sessions a number of times that is less than or equal to a second threshold number of times;
    compare a value, which is based at least in part on a number of the files in the subset, to a third threshold;
    detect whether the plurality of files includes the ransomware based at least in part on whether the value is greater than or equal to the third threshold; and
    selectively trigger an alert, which indicates that the plurality of files includes the ransomware, based at least in part on detection of whether the plurality of files includes the ransomware.

2. The system of claim 1, wherein the processing system is configured to:
- compare the number of the files in the subset to the third threshold; and
- detect whether the plurality of files includes the ransomware based at least in part on whether the number of the files in the subset is greater than or equal to the third threshold.

3. The system of claim 2, wherein the processing system is configured to:
- determine a ratio of the number of the files in the subset to a number of the plurality of files;
- compare the ratio to a fourth threshold; and
- detect whether the plurality of files includes the ransomware based at least in part on whether the number of the files in the subset is greater than or equal to the third threshold and further based at least in part on whether the ratio is greater than or equal to the fourth threshold.

4. The system of claim 1, wherein the processing system is configured to:
- determine a ratio of the number of the files in the subset to a number of the plurality of files;
- compare the ratio to the third threshold; and
- detect whether the plurality of files includes the ransomware based at least in part on whether the ratio is greater than or equal to the third threshold.

5. The system of claim 1, wherein the processing system is configured to:
- determine that a second file is to be included in the subset based at least in part on the second file having a multiple-concatenated file extension during the session.

6. The system of claim 5, wherein the processing system is configured to:
- determine that the second file is to be included in the subset further based at least in part on the multiple-concatenated file extension having an inner extension that is used as an extension for a file during a plurality of sessions a number of times that is greater than or equal to a fourth threshold number of times and further based at least in part on the multiple-concatenated file extension having an outer extension that is used as an extension for a file during the plurality of sessions a number of times that is less than or equal to a fifth threshold number of times.

7. The system of claim 1, wherein the processing system is configured to:
- detect, independently from the content of the plurality of files, that the plurality of files includes the ransomware based at least in part on the value being greater than or equal to the third threshold.

8. The system of claim 1, wherein the processing system is configured to:
- receive a plurality of logs that are initiated based at least in part on a plurality of respective file-related operations being performed on the plurality of respective files during the session; and
- analyze the plurality of logs to identify the plurality of respective files based at least in part on a plurality of indicators in the plurality of respective logs indicating the plurality of respective files.

9. The system of claim 1, wherein the processing system is configured to:
- detect whether the plurality of files includes the ransomware further based at least in part on whether the plurality of files includes an instruction file, which indicates a manner in which payment is to be made to enable decryption of files that have been encrypted by the ransomware.

10. The system of claim 1, wherein a stored file that is included in the subset of the plurality of files is stored in a directory; and
- wherein the processing system is configured to:
  - detect whether the plurality of files includes the ransomware further based at least in part on whether the directory in which the stored file is stored includes an instruction file, which indicates a manner in which payment is to be made to enable decryption of files that have been encrypted by the ransomware.

11. The system of claim 1, wherein the plurality of files is stored among a plurality of directories; and
- wherein the processing system is configured to:
  - determine a number of the files in the subset that are stored in each of the plurality of directories;
  - for each of the plurality of directories, compare a respective second value, which is based at least in part on a number of the files in the subset that are stored in the respective directory, to a fourth threshold;
  - identify each directory that includes at least a portion of the ransomware based at least in part on the respective second value of the respective directory being greater than or equal to the fourth threshold; and
  - generate the alert to indicate each directory that includes at least a portion of the ransomware.

12. The system of claim 11, wherein the processing system is configured to:
- identify each directory that includes at least a portion of the ransomware based at least in part on the respective second value of the respective directory being greater than or equal to the fourth threshold and further based at least in part on the respective directory including an instruction file, which indicates a manner in which payment is to be made to enable decryption of files that have been encrypted by the ransomware.

13. The system of claim 1, wherein the processing system is configured to:
- determine a number of the plurality of files that are uploaded during the session;
- compare the number of the plurality of files that are uploaded during the session to a fourth threshold;
- determine a number of the plurality of files that are deleted during the session;
- compare the number of the plurality of files that are deleted during the session to a fifth threshold; and
- detect whether the plurality of files includes the ransomware further based at least in part on whether the number of the plurality of files that are uploaded during the session is greater than or equal to the fourth threshold and further based at least in part on whether the number of the plurality of files that are deleted during the session is greater than or equal to the fifth threshold.

14. The system of claim 1, wherein the processing system is configured to:
- determine a number of the plurality of files that include a known ransomware extension, wherein each known ransomware extension is an extension that has been identified as having a likelihood of being used in a previous ransomware attack that is greater than or equal to a fourth threshold; and
- detect whether the plurality of files includes the ransomware further based at least in part on whether the number of the plurality of files that include a known ransomware extension is greater than or equal to a fifth threshold.

15. The system of claim 1, wherein the processing system is configured to:
   determine a number of the plurality of files that are encrypted; and
   detect whether the plurality of files includes the ransomware further based at least in part on whether the number of the plurality of files that are encrypted is greater than or equal to a fourth threshold.

16. A method of detecting ransomware among a plurality of files using information that is not included in content of the plurality of files, the method implemented by a computing system, the method comprising:
   determining the plurality of files, which is stored among a plurality of directories, based at least in part on a file-related operation being performed on each of the plurality of files during a session of a cloud-based application, the session defined by a period of time between a start time and an end time;
   determining a subset of the plurality of files such that each file in the subset has multiple file extensions during the session;
   comparing a value, which is based at least in part on a number of the files in the subset, to a threshold;
   detecting that the plurality of files includes the ransomware based at least in part on the value being greater than or equal to the threshold;
   determining a number of the files in the subset that are stored in each of the plurality of directories;
   for each of the plurality of directories, comparing a respective second value, which is based at least in part on a number of the files in the subset that are stored in the respective directory, to a second threshold;
   identifying each directory that includes at least a portion of the ransomware based at least in part on the respective second value of the respective directory being greater than or equal to the second threshold; and
   triggering an alert, which indicates that the plurality of files includes the ransomware and that indicates each directory that includes at least a portion of the ransomware, based at least in part on detecting that the plurality of files includes the ransomware.

17. The method of claim 16, wherein the subset of the plurality of files includes one or more first files stored in one or more directories of the plurality of directories; and
   wherein detecting that the plurality of files includes the ransomware comprises:
      detecting that the plurality of files includes the ransomware further based at least in part on a number of the one or more directories in which the one or more first files are stored that include an instruction file, each instruction file indicating a manner in which payment is to be made to enable decryption of files that have been encrypted by the ransomware.

18. The method of claim 16, wherein, for each of the plurality of directories, comparing the respective second value to the second threshold comprises:
   for each of the plurality of directories, comparing the number of the files in the subset that are stored in the respective directory to the second threshold; and
   wherein identifying each directory that includes at least a portion of the ransomware comprises:
      identifying each directory that includes at least a portion of the ransomware based at least in part on the number of the files in the subset that are stored in the respective directory being greater than or equal to the second threshold.

19. The method of claim 18, further comprising:
   for each of the plurality of directories, determining a ratio of the number of the files in the subset that are stored in the respective directory to a number of the plurality of files that are stored in the respective directory; and
   for each of the plurality of directories, comparing the respective ratio to a third threshold;
   wherein identifying each directory that includes at least a portion of the ransomware comprises:
      identifying each directory that includes at least a portion of the ransomware based at least in part on the number of the files in the subset that are stored in the respective directory being greater than or equal to the second threshold and further based at least in part on the respective ratio being greater than or equal to the third threshold.

20. The method of claim 16, further comprising:
   for each of the plurality of directories, determining a ratio of the number of the files in the subset that are stored in the respective directory to a number of the plurality of files that are stored in the respective directory;
   wherein, for each of the plurality of directories, comparing the respective second value to the second threshold comprises:
      for each of the plurality of directories, comparing the respective ratio to the second threshold; and
   wherein identifying each directory that includes at least a portion of the ransomware comprises:
      identifying each directory that includes at least a portion of the ransomware based at least in part on the respective ratio being greater than or equal to the second threshold.

21. A computer program product comprising a computer-readable storage medium having instructions recorded thereon for enabling a processor-based system to perform operations to detect ransomware among a plurality of files using information that is not included in content of the plurality of files, the operations comprising:
   determining the plurality of files based at least in part on a file-related operation being performed on each of the plurality of files during a session of a cloud-based application, the session defined by a period of time between a start time and an end time;
   determining a subset of the plurality of files such that each file in the subset has multiple file extensions during the session, said determining of the subset comprising:
      determining that a first file has a multiple-concatenated file extension during the session;
      determining that the multiple-concatenated file extension has an inner extension that is used as an extension for a file during a plurality of sessions a number of times that is greater than or equal to a first threshold number of times; and
      determining that the multiple-concatenated file extension has an outer extension that is used as an extension for a file during the plurality of sessions a number of times that is less than or equal to a second threshold number of times;
   comparing a value, which is based at least in part on a number of the files in the subset, to a third threshold;
   detecting whether the plurality of files includes the ransomware based at least in part on whether the value is greater than or equal to the third threshold; and selectively triggering an alert, which indicates that the plurality of files includes the ransomware, based at least in part on detection of whether the plurality of files includes the ransomware.

22. The computer program product of claim 21, wherein the plurality of files is stored among a plurality of directories; and
wherein the operations comprise:
determining a number of the files in the subset that are stored in each of the plurality of directories;
for each of the plurality of directories, comparing a respective second value, which is based at least in part on a number of the files in the subset that are stored in the respective directory, to a fourth threshold;
identifying each directory that includes at least a portion of the ransomware based at least in part on the respective second value of the respective directory being greater than or equal to the fourth threshold; and
generating the alert to indicate each directory that includes at least a portion of the ransomware.

23. The computer program product of claim 22, wherein the operations comprise:
identifying each directory that includes at least a portion of the ransomware based at least in part on the respective second value of the respective directory being greater than or equal to the fourth threshold and further based at least in part on the respective directory including an instruction file, which indicates a manner in which payment is to be made to enable decryption of files that have been encrypted by the ransomware.

24. The computer program product of claim 21, wherein the operations comprise:
determining a number of the plurality of files that are uploaded during the session;
comparing the number of the plurality of files that are uploaded during the session to a fourth threshold;
determining a number of the plurality of files that are deleted during the session;
comparing the number of the plurality of files that are deleted during the session to a fifth threshold; and
detecting whether the plurality of files includes the ransomware further based at least in part on whether the number of the plurality of files that are uploaded during the session is greater than or equal to the fourth threshold and further based at least in part on whether the number of the plurality of files that are deleted during the session is greater than or equal to the fifth threshold.

* * * * *